United States Patent
Choi et al.

(10) Patent No.: US 10,234,618 B2
(45) Date of Patent: Mar. 19, 2019

(54) DISPLAY BACKLIGHT UNIT WITH SELECTIVELY ACTIVATED LIGHT SOURCES

(71) Applicant: SAMSUNG ELECTRONICS CO., LTD., Suwon-si (KR)

(72) Inventors: Yoonsun Choi, Yongin-si (KR); Jinho Lee, Suwon-si (KR); Dong Kyung Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 51 days.

(21) Appl. No.: 15/370,110

(22) Filed: Dec. 6, 2016

(65) Prior Publication Data
US 2017/0192152 A1    Jul. 6, 2017

(30) Foreign Application Priority Data
Jan. 6, 2016    (KR) .................... 10-2016-0001519

(51) Int. Cl.
| G02F 1/13357 | (2006.01) |
| F21V 8/00 | (2006.01) |
| G02B 27/22 | (2018.01) |

(52) U.S. Cl.
CPC ......... *G02B 6/0036* (2013.01); *G02B 6/0038* (2013.01); *G02B 6/0055* (2013.01); *G02B 6/0068* (2013.01); *G02B 27/22* (2013.01)

(58) Field of Classification Search
CPC ............ G02F 1/133615; G02B 6/0011; G02B 6/0033; G02B 6/0035; G02B 6/0036; G02B 6/004; G02B 6/0043; G02B 6/0068; G02B 6/0073; G02B 6/0091
See application file for complete search history.

(56) References Cited

U.S. PATENT DOCUMENTS

| 5,396,350 | A | * | 3/1995 | Beeson | ...................... F21V 5/02 349/62 |
| 5,428,468 | A | * | 6/1995 | Zimmerman | .............. F21V 5/02 349/62 |
| 5,625,968 | A | * | 5/1997 | Ashall | .................. G02B 6/0043 362/604 |
| 5,761,355 | A | * | 6/1998 | Kuper | ....................... F21V 5/02 385/36 |
| 6,129,439 | A | * | 10/2000 | Hou | .......................... F21V 5/02 362/23.15 |

(Continued)

FOREIGN PATENT DOCUMENTS

| EP | 2045633 A1 | 4/2009 |
| WO | 2006/013491 A1 | 2/2006 |

OTHER PUBLICATIONS

Communication dated Mar. 24, 2017, issued by the European Patent Office in counterpart European Application No. 16207270.6.

Primary Examiner — Ismael Negron
(74) Attorney, Agent, or Firm — Sughrue Mion, PLLC

(57) ABSTRACT

A backlight unit includes a first light source, a second light source, and a light guide plate having, on an upper surface, and, on a lower surface, a second pattern. The first pattern extracts, from the light guide plate, light from the first and second light sources, and emits the light towards a display panel. The second pattern extracts, from the light guide plate, light from the second light source, and emits the light toward the display panel. A display panel may include the backlight unit.

22 Claims, 10 Drawing Sheets

(56) References Cited

U.S. PATENT DOCUMENTS

| | | | | |
|---|---|---|---|---|
| 7,452,120 B2* | 11/2008 | Lee | ............... | G02B 5/045 |
| | | | | 362/223 |
| 8,029,180 B2* | 10/2011 | Takahashi | ............ | G02B 6/0068 |
| | | | | 349/65 |
| 8,199,279 B2* | 6/2012 | Choi | ............... | G02B 6/0038 |
| | | | | 349/62 |
| 8,427,602 B2* | 4/2013 | Mun | ............... | G02B 6/0056 |
| | | | | 349/65 |
| 8,432,512 B2* | 4/2013 | Kim | ............... | G02B 6/0053 |
| | | | | 349/65 |
| 8,531,625 B2 | 9/2013 | Sohn et al. | | |
| 8,534,900 B2* | 9/2013 | Zhou | ............... | G02B 6/0058 |
| | | | | 362/615 |
| 8,860,906 B2 | 10/2014 | Choi et al. | | |
| 8,917,447 B2 | 12/2014 | Wolk et al. | | |
| 8,950,923 B2 | 2/2015 | Minami | | |
| 2012/0032997 A1 | 2/2012 | Cha et al. | | |
| 2012/0127573 A1 | 5/2012 | Robinson et al. | | |
| 2013/0307831 A1 | 11/2013 | Robinson et al. | | |
| 2016/0187575 A1* | 6/2016 | Fan | ............... | G02B 6/0068 |
| | | | | 362/612 |
| 2016/0216433 A1* | 7/2016 | Lee | ............... | G02B 6/0036 |

\* cited by examiner

FIG. 4
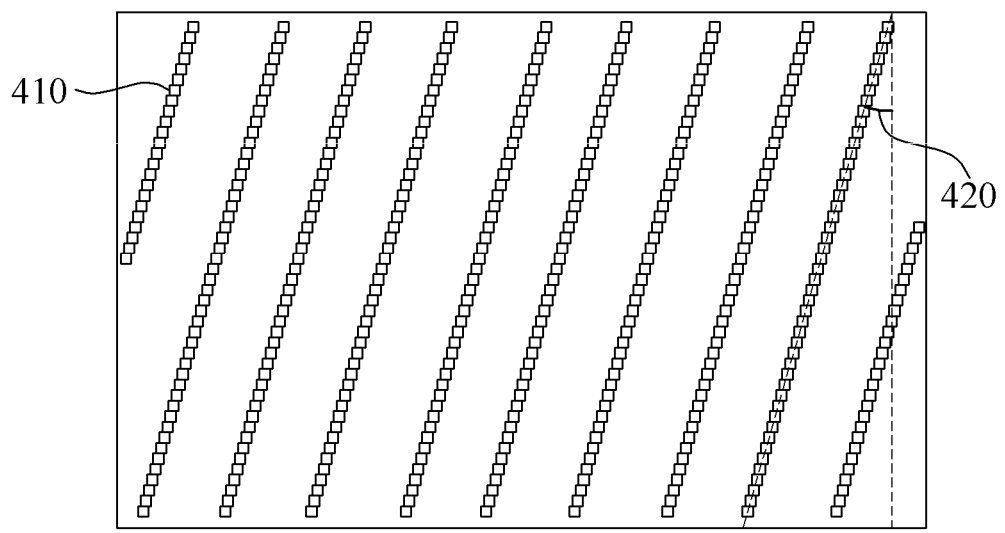
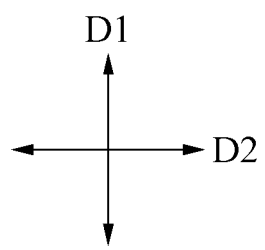

FIG. 8
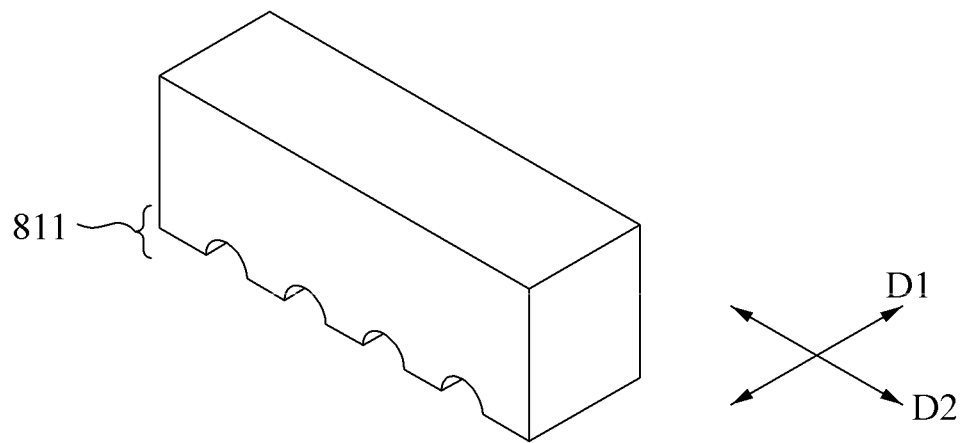
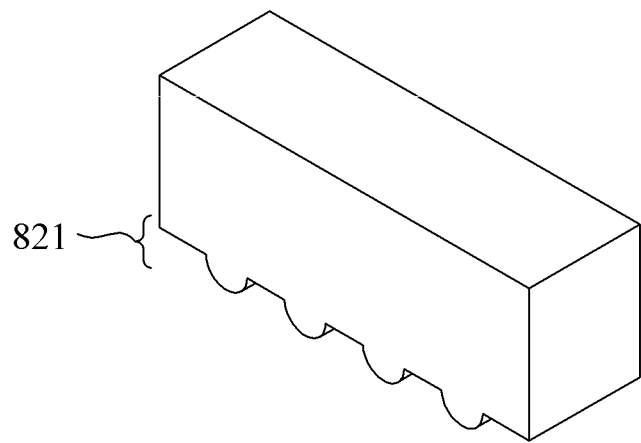

DISPLAY BACKLIGHT UNIT WITH SELECTIVELY ACTIVATED LIGHT SOURCES

CROSS-REFERENCE TO RELATED APPLICATION

This application claims benefit under 35 U.S.C. § 119 to Korean Patent Application No. 10-2016-0001519, filed on Jan. 6, 2016, in the Korean Intellectual Property Office, the contents of which are incorporated herein by reference in their entirety.

BACKGROUND

1. Field

Apparatuses related to exemplary embodiments relate exemplary embodiment to a backlight unit and to a display device including the backlight unit.

2. Description of the Related Art

Typically, a three-dimensional (3D) image is displayed in view of stereo view principles related to a viewer's two eyes. A 3D image display may be a stereoscopic display or an autostereoscopic display. An autostereoscopic display presents a 3D image by separating an image into a left image and a right image and directing these images to the left and right eyes of a viewer, respectively, without using glasses. An autostereoscopic display uses, for example, a parallax barrier method or a lenticular method.

In the parallax barrier method and the lenticular method, a barrier or a lens array is formed on a front surface of a display panel which is otherwise configured to display a two-dimensional (2D) image. When the barrier or the lens array used, a user does not perceive a 2D image. Thus, in order for the user to view a 2D image, the barrier or the lens array must be removed. In order to avoid the necessity of this cumbersome method of switching between a 3D display and a 2D display, techniques for displaying a 2D image and a 3D image on a single display device are in development.

SUMMARY

One or more exemplary embodiments relate to a backlight unit configured to provide light to a display panel.

According to an aspect of an exemplary embodiment, the backlight unit includes a first light source configured to provide a light to a light guide plate in a three-dimensional (3D) image display mode, a second light source configured to provide a light to the light guide plate in a two-dimensional (2D) image display mode, and the light guide plate configured to include, on an upper surface, a first pattern for emitting the light incident from the first light source toward the display panel, and to include, on a lower surface, a second pattern for emitting the light incident from the second light source toward the display panel.

A plurality of first patterns may protrude from the upper surface of the light guide plate, and apply a directivity to the light guided in the light guide plate and emit the light to which the directivity is applied toward the display panel, wherein the light guided in the light guide plate comprises the light incident from the first light source or the second light source.

A cross-section of an area in which the light is emitted from the first pattern may have a shape greater than a cross-section of an area in which the light being guided in the light guide plate is incident to the first pattern.

The first pattern may be formed as a plurality of protruding inverse-trapezoid structures, arranged in at least one line on the upper surface of the light guide plate.

The at least one line of the protruding inverse-trapezoid structures may be slanted at an angle with respect to a pixel included in the display panel.

The first pattern may be formed in accordance with a 3D display technique that is applied to the display panel.

The second pattern may be arranged to align in parallel with a direction in which the light incident from the first light source is guided in the light guide plate.

A plurality of second patterns may be recessed on the lower surface of the light guide plate, and may emit the light incident from the second light source toward the display panel.

A plurality of second patterns may protrude from the lower surface of the light guide plate, and may emit the light incident from the second light source toward the display panel.

The second pattern may comprise a plurality of elements, each formed as one of a lenticular lens, a prism, and a bump.

The first light source and the second light source may be disposed along different edges of the light guide plate that do not face each other. In other words, the first light source and the second light source maybe arranged adjacent to perpendicular sides of the light guide plate.

One or more exemplary embodiments relate to a display device.

According to an aspect of an exemplary embodiment, the display device includes a display panel configured to display a 3D image or a 2D image, a first light source configured to provide light to a light guide plate in a mode in which the 3D image is displayed on the display panel, a second light source configured to provide light to the light guide plate in a mode in which the 2D image is displayed on the display panel, and the light guide plate configured to include, on an upper surface, a first pattern for emitting the light incident from the first light source toward the display panel, and to include, on a lower surface, a second pattern for emitting the light incident from the second light source toward the display panel.

Additional aspects of exemplary embodiments will be set forth in part in the description which follows and, in part, will be apparent from the description, or may be learned by practice of the disclosure.

BRIEF DESCRIPTION OF THE DRAWINGS

These and/or other exemplary aspects and advantages will become apparent and more readily appreciated from the following description of exemplary embodiments, taken in conjunction with the accompanying drawings of which: request PDF copy of drawings

FIG. 4 illustrates an example of a first pattern according to at least one exemplary embodiment;

FIGS. 8 through 10 are perspective views illustrating examples of a second pattern included on a lower surface of a light guide plate according to at least one exemplary embodiment.

DETAILED DESCRIPTION

Figure 1:
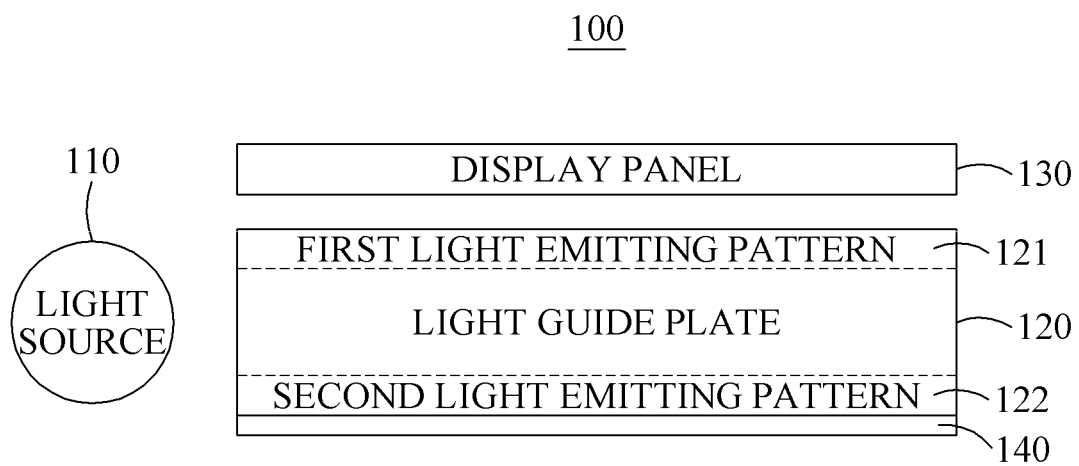
FIG. 1 is a cross-sectional view illustrating a display device according to at least one exemplary embodiment.

Hereinafter, some exemplary embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of exemplary embodiments, detailed descriptions of well-known related structures or functions will be omitted when it is deemed that such descriptions will cause ambiguous interpretation of the present disclosure.

It should be understood, however, that there is no intent to limit this disclosure to the particular exemplary embodiments disclosed. On the contrary, exemplary embodiments are to cover all modifications, equivalents, and alternatives falling within the scope of the exemplary embodiments. Like numbers refer to like elements throughout the description of the figures.

In addition, terms such as first, second, A, B, (a), (b), and the like may be used herein to describe components. Each of these terminologies is not used to define an essence, order or sequence of corresponding components but is used merely to distinguish the corresponding component from other component(s). It should be noted that if it is described in the specification that one component is "connected", "coupled", or "joined" to another component, a third component may be "connected", "coupled", or "joined" between the first and second components. Alternately, the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various exemplary embodiments will now be described more fully with reference to the accompanying drawings in which some exemplary embodiments are shown. In the drawings, the thicknesses of layers and regions are exaggerated for clarity.

Unless otherwise defined, all terms including technical and scientific terms used herein have the same meaning as commonly understood by one of ordinary skill in the art to which examples belong. It will be further understood that such terms, including those defined in commonly-used dictionaries, should be interpreted as having a meaning that is consistent with their meaning in the context of the relevant art and the present disclosure and will not be interpreted in an idealized or overly formal sense unless expressly so defined herein.

At least one exemplary embodiment may be configured to display a three-dimensional (3D) image or a two-dimensional (2D) image on a single display device. The single display device may be any of various types of products, for example, a personal computer (PC), a laptop computer, a tablet computer, a smartphone, a television (TV), a smart electronic device, a smart car, a wearable device, a digital information display (DID), or the like. For example, at least one exemplary embodiment may be applicable to display a 3D image or a 2D image on a smartphone, a mobile device, a TV, a DID, or the like. Hereinafter, at least one exemplary embodiment will be described with reference to the accompanying drawings in which like reference numerals refer to like elements throughout.

FIG. 1 is a cross-sectional view illustrating a display device according to at least one exemplary embodiment.

Referring to FIG. 1, a display device 100 may include a light source 110, a light guide plate 120, and a display panel 130.

The light source 110 is a device that generates a light, and may include, for example, one or more light emitting diodes (LEDs), cold cathode fluorescent lamps (CCFLs), or line LEDs. The light generated by the light source 110 may be provided to the display panel 130 through the light guide plate 120, such that a user may view an image displayed on the display panel 130. The light source 110 may be positioned on one side/edge of the light guide plate 120. Alternatively, the light source 110 may be positioned on each of both sides of the light guide plate 120.

The light guide plate 120 may guide the light incident from the light source 110 toward the display panel 130. The light guide plate 120 may guide the light incident from the light source 110 within the light guide plate 120 by total internal reflection—note that "total internal reflection" is the term of art in English. The light guide plate 120 may include a first pattern 121 on an upper surface and may include a second pattern 122 on a lower surface. If the light being guided within the light guide plate 120 encounters at least one of the first pattern 121 and the second pattern 122, the light may be refracted—note that the term of art in English is "refracted". If the refracted light does not satisfy a condition of total internal reflection, the light may be emitted from the light guide plate 120 toward the display panel 130.

The display panel 130 is a device that displays a 2D image or a 3D image. Any type of device configured to display an image using an applied power may be used as the display panel 130.

A reflector 140 may be disposed at the rear of the light guide plate 120. The reflector 140 may reflect light that is emitted through the second pattern 122 to prevent a loss of the light guided within the light guide plate 120.

Figure 2:
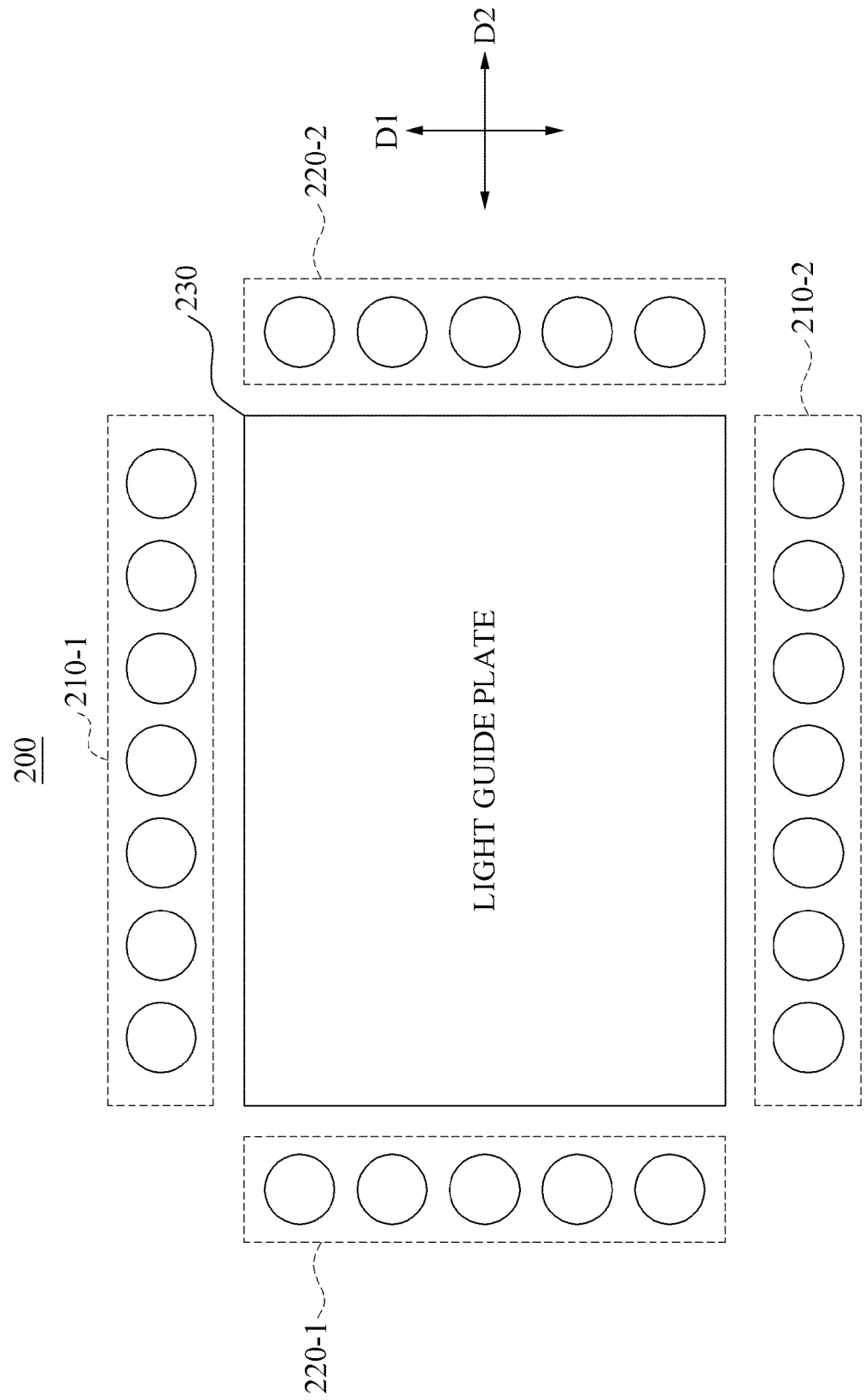
FIG. 2 is a top view illustrating a backlight unit according to at least one exemplary embodiment.

FIG. 2 is a top view illustrating a backlight unit according to at least one exemplary embodiment.

Referring to FIG. 2, a backlight unit 200 may include first light sources 210-1 and 210-2, second light sources 220-1 and 220-2, and a light guide plate 230.

The backlight unit 200 is a device that is provided at a rear of a display panel, and may provide light, generated by the first light sources 210-1 and 210-2 and the second light sources 220-1 and 220-2, to the display panel via the light guide plate 230. The backlight unit 200 corresponds to an edge-type backlight unit that includes a light source on its side.

The first light sources 210-1 and 210-2 and the second light sources 220-1 and 220-2 may be provided on side surfaces of the light guide plate 230. The first light sources 210-1, 210-2 and the second light sources 220-1, 220-2 may be disposed on different side surfaces of the light guide plate 230, such that the first light sources do not face the second light sources. For example, the first light source 210-1 may be disposed on a side of the light guide plate 230 adjacent to and perpendicular to a side on which the second light source 220-1 is disposed. Accordingly, a first direction D1 in which the light incident from the first light source 210-1, 210-2 is guided in the light guide plate 230 differs from a second direction D2 in which the light incident from the second light source 220-1, 220-2 is guided in the light guide plate 230. For example, a difference between the first direction D and the second direction D2 may be about 90 degrees.

When a 3D image is to be displayed on the display panel, the first light sources 210-1 and 210-2 may provide the light to the light guide plate 230. it's not "in response" The first light sources 210-1 and 210-2 may be disposed side surfaces of the light guide plate 230 that face each other. Alternatively, the first light sources 210-1 and 210-2 may be disposed together on only one side surface of the light guide plate 230.

When a 2D image is to be displayed on the display panel, the second light sources 220-1 and 220-2 may provide the light to the light guide plate 230. The second light sources 220-1 and 220-2 may be disposed side surfaces of the light guide plate 230 that face each other. Alternatively, the second light sources 220-1 and 220-2 may be disposed together on only one side surface of the light guide plate 230.

Although FIG. 2 illustrates the first light source 210-1 disposed to face the first light source 210-2 and illustrates the second light source 220-1 disposed to face the second light source 220-2, this is only exemplary. Alternately, for example, the first light source 210-1 may be disposed on one side surface, and the second light source 220-1 may be disposed on another side surface of the light guide plate 230, and the first light source 210-2 and the second light source 220-2 may be omitted.

Figure 3:
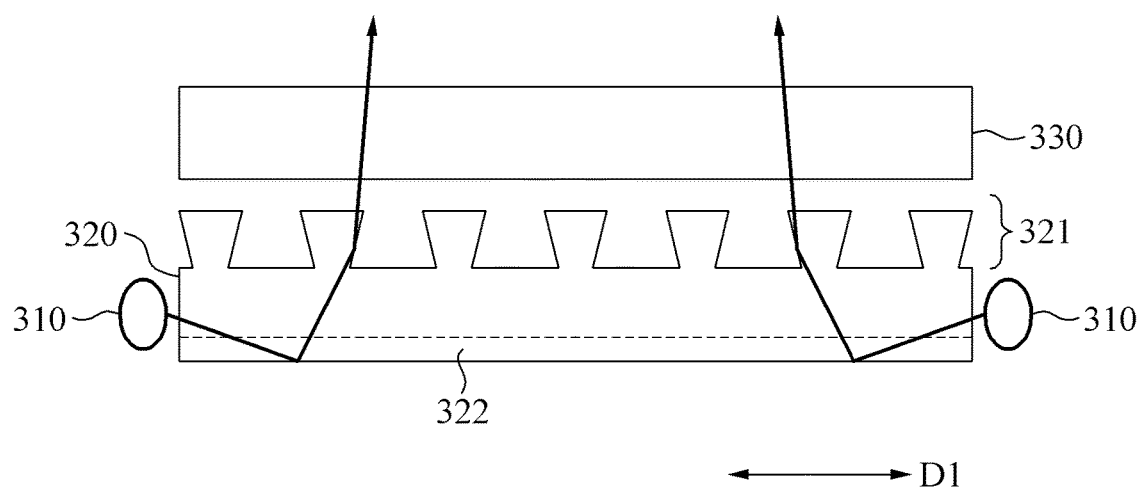
FIG. 3 is a cross-sectional view to describe a process of emitting a light from a light guide plate toward a display panel through a first pattern according to at least one exemplary embodiment.

FIG. 3 is a cross-sectional view illustrating a process of emitting light from a light guide plate toward a display panel through a first pattern according to at least one exemplary embodiment.

FIG. 3 illustrates an example of a path of light incident on the light guide plate 320 from a first light source 310, guided within the light guide plate 320, and emitted toward a display panel 330 via a first pattern 321. FIG. 3 is a cross-sectional view of a display device operating using light incident from a first direction D1.

The first pattern 321 may be included on an upper surface of the light guide plate 320 and may emit the light being guided within the light guide plate 320 toward the display panel 330. The first pattern 321 may be integrally formed with the light guide plate 320, as shown. Accordingly, there may be no optical boundary between the first pattern 321 and the light guide plate 320. For example, the first pattern 321 may be formed on the upper surface of the light guide plate 320 using an embossing method and thus be integrally formed with the light guide plate 320. Alternatively, the light guide plate 320 and the first pattern 321 may be individually manufactured and connected to each other without an optical boundary between the light guide plate 320 and the first pattern 321.

The first pattern 321 may comprise a plurality of structures which protrude from the upper surface of the light guide plate 320, may control a direction in which light, guided within the light guide plate 320, via total internal reflection, is emitted toward the display panel 330. The light guide plate 320 may thereby effectively operate as a line light source by emitting the directional light toward the display panel 330 through the first pattern 321, which may include the plurality of structures arranged in one or more lines.

A cross-sectional area through which light is emitted from the first pattern 321 may be larger than a cross-sectional area through which the light guided in the light guide plate 320 is incident to the first pattern 321. For example, as shown in FIG. 3, the plurality of structures of the first pattern 321 may be a plurality of protruding inverse-trapezoid structures formed on the upper surface of the light guide plate 320.

The light incident from the first light source 310 may be guided within the light guide plate 320 by total internal reflection, may be totally internally reflected by a slanted inner side surface of a structure of the first pattern 321, and may thereafter be emitted toward the display panel 330. The light incident from the first light source 310 may be unaffected by the second pattern 322 disposed on the lower surface of the light guide plate 320.

The display panel 330 may receive the directional light from the light guide plate 320 and may thereby display a 3D image.

FIG. 4 illustrates an example of a first pattern according to at least one exemplary embodiment.

Referring to FIG. 4, a light guide plate 400 may include a first pattern 410. FIG. 4 illustrates a top view of the light guide plate 400 that includes the first pattern 410.

The first pattern 410 may comprise lines of protruding inverse-trapezoid structures formed on an upper surface of the light guide plate 400, and may thereby control a directivity of the light emitted toward the display panel through the first pattern 410. The light guide plate 400 may control the directivity of the light and operate as a line light source by emitting, toward the display panel through the first pattern 410, the light incident thereon from the first light source.

The line arrangement of the protruding inverse-trapezoid structures of the first pattern 410 may be slanted at an angle 420 with respect to a pixel included in the display panel. Here, the angle 420 may represent a slanted angle. Since the line arrangement of the protruding inverse-trapezoid structures of the first pattern 410 is slanted at the angle 420, it is possible to enhance a quality of a 3D image displayed on the display panel and to increase the number of views of the 3D image.

The first pattern 410 may be formed based on a 3D image display technique applied to the display panel. For example, a pitch, a width, and the angle 420 of the protruding inverse-trapezoid structure of the first pattern 410 may be determined based on the 3D image display technique. The angle 420 may be determined based on a desired number of views of the 3D image displayed on the display panel. An angle of reflection with respect to the first pattern 410 of the protruding inverse-trapezoid structures may be the same as a viewing angle of the 3D image.

Figure 5:
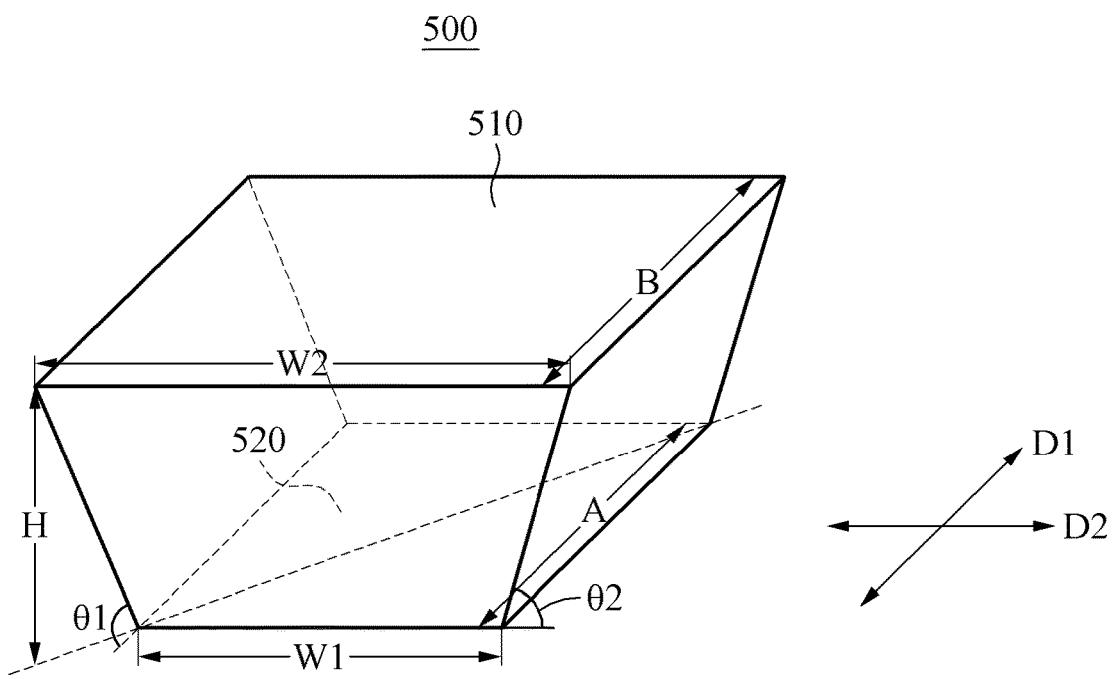
FIG. 5 illustrates an example of a protruding inverse-trapezoid structure of a first pattern according to at least one exemplary embodiment.

FIG. 5 illustrates an example of a protruding inverse-trapezoid structure of a first pattern according to at least one exemplary embodiment.

Referring to FIG. 5, a first pattern comprises a plurality of protruding inverse-trapezoid structures 500.

The protruding inverse-trapezoid structures 500 of the first pattern may be included on an upper surface of a light guide plate. Light being guided in the light guide plate may be incident into the protruding inverse-trapezoid structure 500 through a bottom surface 520. The incident light may be emitted toward a display panel through a top surface 510.

The protruding inverse-trapezoid structure 500 may have a lower width W1, an upper width W2, a height H, a lower side length A, an upper side length B, a first angle θ1, and a second angle θ2. The protruding inverse-trapezoid structure 500 may include sides that are slanted at the first angle θ1 and the second angle θ2.

The top surface 510 of the protruding inverse-trapezoid structure 500 corresponds to a surface area through which light is emitted to the display panel, the bottom surface 520 corresponds to a surface area through which light guided within the light guide plate is incident into the protruding inverse-trapezoid structure 500. In the protruding inverse-trapezoid structure 500, a cross-sectional area of the top surface 510 may be larger than a cross-sectional area of the bottom surface 520 due to the first angle θ1 and the second angle θ2.

For example, if light incident from a first light source is guided in a first direction D1 within the light guide plate, the light may be incident into the protruding inverse-trapezoid structure 500 via the bottom surface 520. The incident light may be totally internally reflected at front and rear sides of the protruding inverse-trapezoid structure 500 which are slanted at the first angle θ1 and may be emitted toward the display panel through the top surface 510.

The amount of light emitted from the protruding inverse-trapezoid structure 500 toward the display panel may be adjusted by adjusting the lower width W1 and the lower side length A, thus adjusting a cross-sectional area of the bottom surface 520. As the lower width W1 and the lower side length A increase, a probability of the light guided within the light guide plate being incident into the protruding inverse-trapezoid structure 500 increases. Thus, an amount of light emitted toward the display panel through the protruding inverse-trapezoid structure 500 may increase. Also, a viewing angle of the 3D image displayed on the display panel may be adjusted by adjusting the lower width W1 and the lower side length A.

For example, if light incident from a second light source is guided in a second direction D2 within the light guide plate, the light may be incident into the protruding inverse-trapezoid structure 500 through the bottom surface 520. The incident light may be totally internally reflected at left and right sides of the protruding inverse-trapezoid structure slanted at the second angle θ2 and may be emitted toward the display panel. Thus, the amount of light emitted toward the display panel through the protruding inverse-trapezoid structure 500 and a viewing angle of an image displayed on the display panel may be adjusted by adjusting the lower width W1 and the lower side length A.

Figure 6:
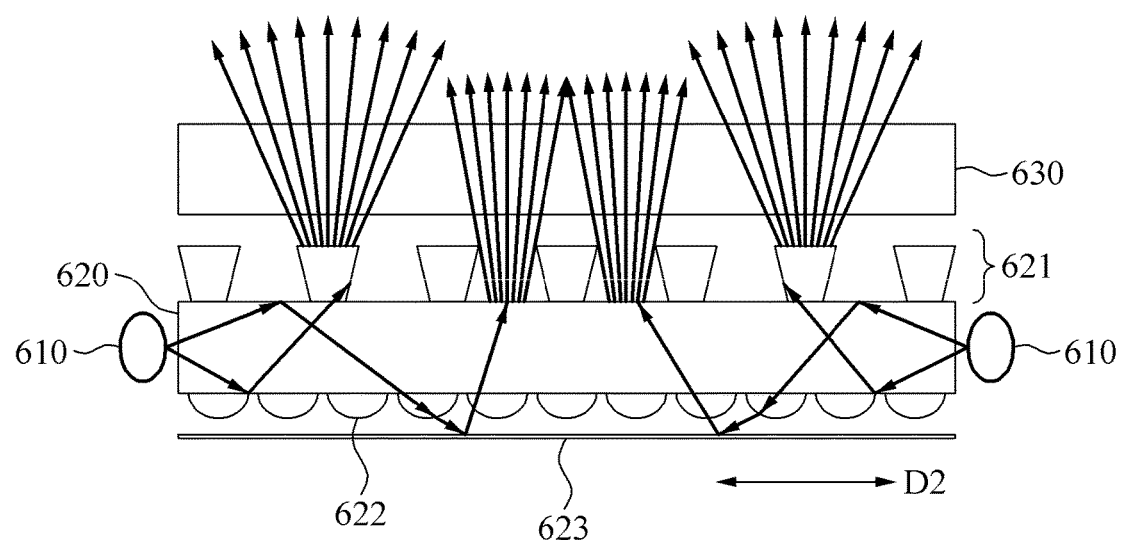
FIG. 6 is a cross-sectional view to describe a process of emitting a light from a light guide plate toward a display panel through a second pattern according to at least one exemplary embodiment.

FIG. 6 is a cross-sectional view illustrating a process of emitting light from a light guide plate toward a display panel through a second pattern according to at least one exemplary embodiment.

FIG. 6 illustrates an example of a path of light incident on a light guide plate 620 from a second light source 610, guided within the light guide plate 620, and then emitted toward a display panel 630 via a first pattern 621 and a second pattern 622. FIG. 6 is a cross-sectional view of a display device operating using light incident from a second direction D2.

The light incident from the second light source 610 may be guided in the second direction D2 within the light guide plate 620. In contrast to light incident from the first light source, the light incident from the second light source 610 may be emitted toward the display panel 630 by the second pattern 622 included on a lower surface of the light guide plate 620 as well as by the first pattern 621.

The first pattern 621 may be included on an upper surface of the light guide plate 620 and may emit the light being guided in the light guide plate 620 toward the display panel 630. The description of FIG. 3 may be applicable to the first pattern 621 and a further description related thereto will be omitted.

The second pattern 622 may be included on a lower surface of the light guide plate 620 and may refract the light being guided in the light guide plate 620 such that the light is ultimately emitted toward the display panel 630. The second pattern 622 may be integrally formed with the light guide plate 620, such that there is no optical boundary between the second pattern 622 and the light guide plate 620.

The light incident from the second light source 610 may be guided within the light guide plate 620 in the second direction D2 by total internal reflection. As shown in FIG. 6, the light may be reflected at the bottom of the light guide plate 620 and may be thus emitted toward the display panel 630. Alternatively, light incident on the second pattern 622 may be refracted, may be thus guided toward a reflector 623, may be reflected at the reflector 623, and may be thus emitted toward the display panel 630. The light reflected at the bottom of the light guide plate or at the reflector 623 may be thus guided toward a slanted inner side surface of the first pattern 621, may be totally internally reflected at the inner side surface of the first pattern 610, and may be thus emitted toward the display panel 630. Alternatively, if the refracted light does not satisfy a condition of total internal reflection at the top of the light guide plate 620, the light may then be emitted toward the display panel 630 through an area of the upper surface of the light guide plate on which a protruding inverse-trapezoid structure of the first pattern 621 is absent.

Since the light incident from the second light source 610 is emitted toward the display panel 630 through the protruding inverse-trapezoid structures, and also through areas of the upper surface of the light guide plate 620 in which the protruding inverse-trapezoid structures are first pattern absent, the light thus emitted does not have the same directivity as the light emitted only through the protruding inverse-trapezoid structures. Accordingly, the light guide plate 620 may operate as a surface light source that provides substantially directivity-free light.

Although FIG. 6 illustrates a second pattern 622 comprising a plurality of lenticular lens structures disposed on the lower surface of the light guide plate 620, this is only an example. Various shapes and structures may be applicable to the second light guiding pattern 622. Examples of the various shapes and structures will be described with reference to FIGS. 8 through 10.

The display panel 630 may receive the directivity-free light from the light guide plate 620 and may thereby display a 2D image.

Figure 7:
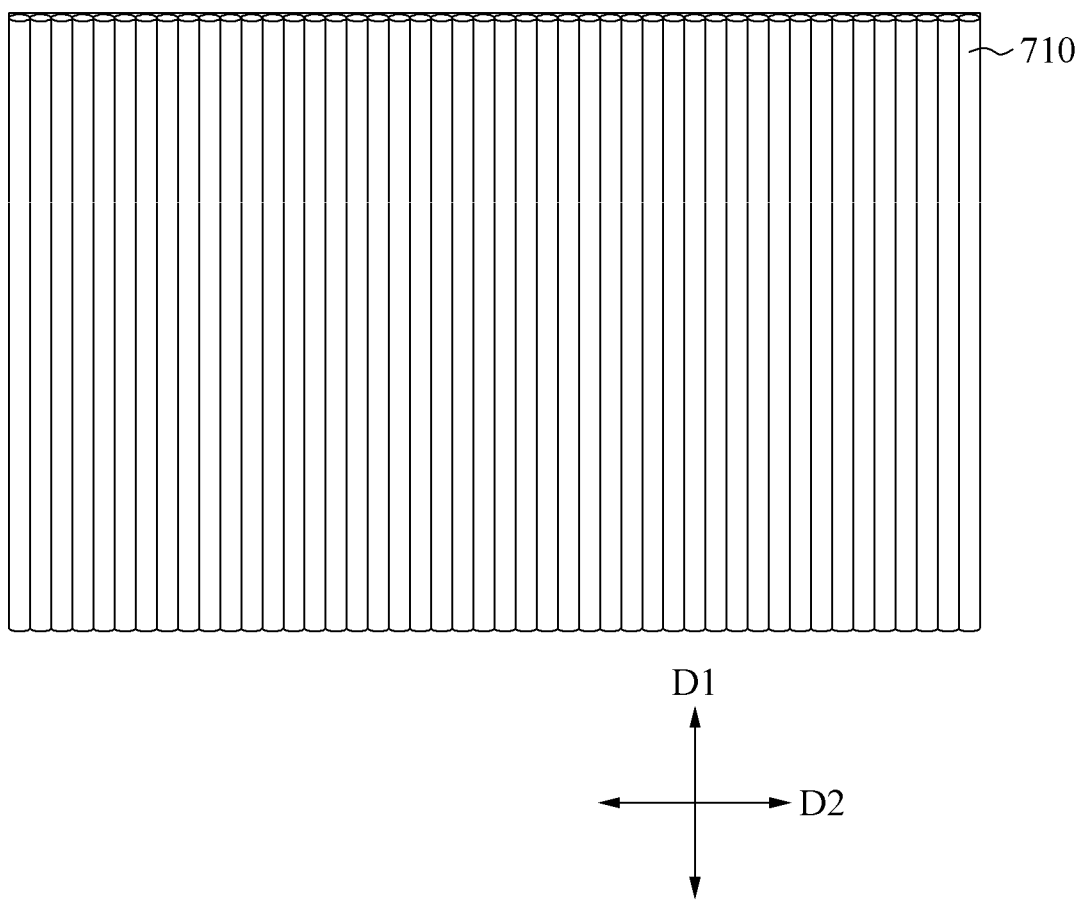
FIG. 7 illustrates an example of a second pattern according to at least one exemplary embodiment.

FIG. 7 illustrates an example of a second pattern according to at least one exemplary embodiment.

Referring to FIG. 7, a light guide plate 700 may include a second pattern 710 on a lower surface. FIG. 7 illustrates a bottom view of the light guide plate 700 that includes the second pattern 710. Here, it is assumed that a first light source configured to generate a light for displaying a 3D image on a display panel is disposed on each of upper and lower sides of the light guide plate 700 and a second light source configured to generate a light for displaying a 2D image on the display panel is disposed on each of left and right sides of the light guide plate 700. Accordingly, the light guide plate 700 may guide the light incident from the first light source in a first direction D1 and may guide the light incident from the second light source in a second direction D2.

The second pattern 710 may be formed to be in parallel with the first direction D1 in which the light incident from the first light source is guided. Since the second pattern 710 is formed to be in parallel with the first direction D1, the light incident form the first light source may be guided in the light guide plate 700 without being effected by the second pattern 710.

Conversely, the second pattern 710 may affect the light that is incident from the second light source and guided along the second direction D2. The second pattern 710 may totally internally reflect light being guided along the second direction D2, such that the light may be emitted toward the display panel.

The second pattern 710 may be arranged at an angle of 90 degrees with respect to the first pattern 410 in order to preclude interference with the first pattern 410.

Figure 9:
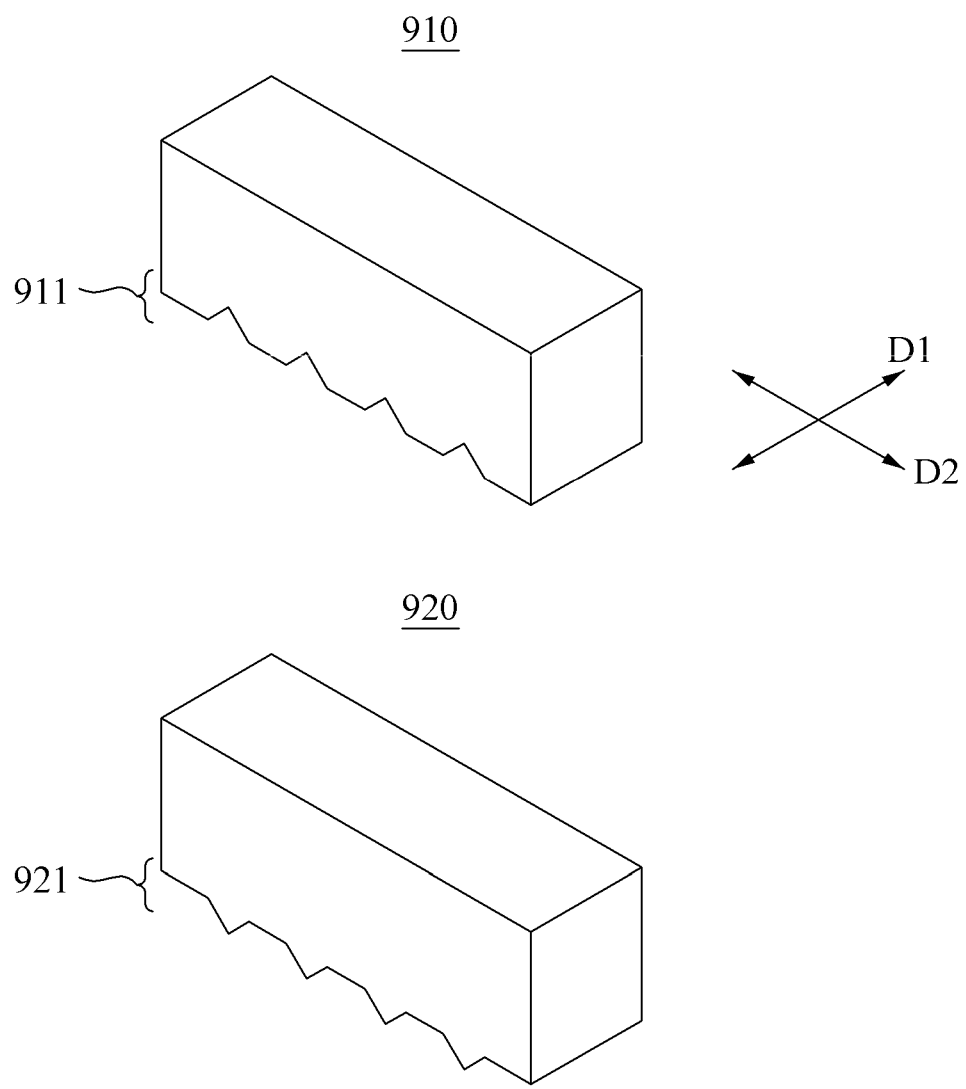
Figure 10:
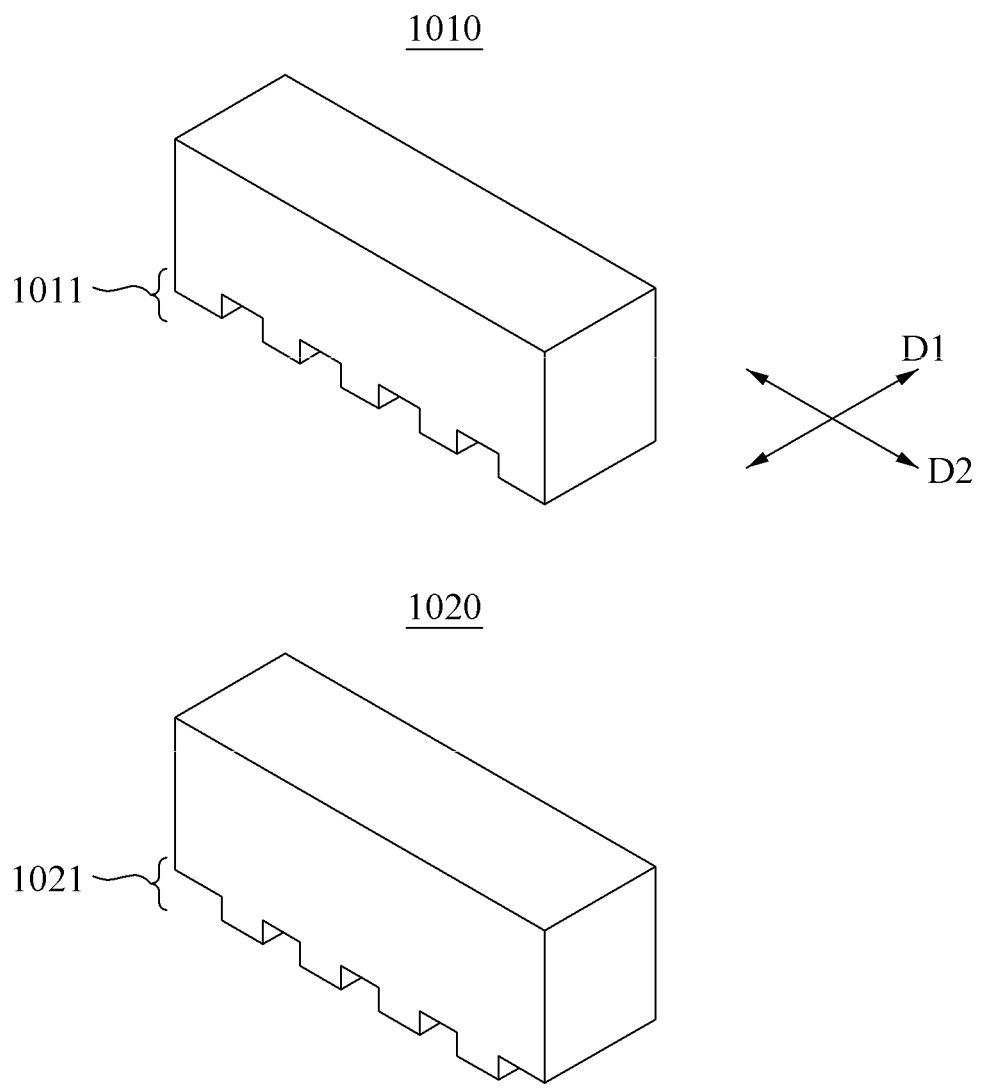

FIGS. 8 through 10 are perspective views illustrating examples of a second patterns included on a lower surface of a light guide plate according to exemplary embodiments.

Referring to FIGS. 8 through 10, second patterns 811, 821, 911, 921, 1011, 1021 are formed in various shapes and structures on the lower surface of light guide plates 810, 820, 910, 920, 1010, 1020. Here, for clarity of description, a first pattern included on the upper surface of the light guide plates 810, 820, 910, 920, 1010, 1020 is not illustrated.

Exemplary second patterns 811, 911, and 1011 may be recessed into the lower surface of the light guide plates 810, 910, 1010. Alternatively, exemplary second patterns 821, 921, 1021 may protrude from the lower surface of the light guide plates 820, 920, 1020.

A second pattern may be formed of a plurality of lenticular lenses, prisms, and other protrusions or may be formed of a plurality of structures recessed into the light guide plate. For example, the second pattern 811 comprises a plurality of recessed lenticular lenses, and the second pattern 821 comprises a plurality of protruding lenticular lenses. The second pattern 911 comprises a plurality of recessed prisms, and the second pattern 921 comprises a plurality of protruding prisms. The second pattern 1011 comprises a plurality of recessed polygonal shapes, and the second pattern 1021 comprises a plurality of protruding polygonal shapes.

According to exemplary embodiments, switching between a 2D image and a 3D image may be executed in a display device comprising a light guide plate pattern by disposing different light emitting patterns on an upper surface and a lower surface of the light guide plate, respectively. Without using an additional device, such as a polymer dispersed liquid crystal (PDLC), a lens array, a switchable barrier, or the like, it is possible to prevent an increase in production cost and a thickness of a display device.

According to exemplary embodiments, light incident from a first light source may not be effected by a second pattern and a line light source may be efficiently implemented by forming the second pattern to extend parallel to a direction in which the light incident from the first light source is guided.

According to exemplary embodiments, switching between a 2D image and a 3D image may be simply implemented by turning on one of a first light source and a second light source based on whether a 3D image or a 2D image is to be displayed on a display panel.

Some of the units and/or modules described herein may be implemented using hardware components and software components. For example, a processing device may be implemented using one or more hardware processors configured to carry out and/or execute program code, stored in a memory, by performing arithmetical, logical, and input/output operations. A processing device(s) may include a processor, a controller and an arithmetic logic unit, a digital signal processor, a microcomputer, a field programmable array, a programmable logic unit, a microprocessor or any other device capable of responding to and executing instructions in a defined manner. A processing device may run an operating system (OS) and one or more software applications that run on the OS. A processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods consistent with the above-described exemplary embodiments may be recorded in non-transitory computer-readable media including program instructions to implement various operations of the above-described exemplary embodiments. The media may also include, alone or in combination with the program instructions, data files, data structures, and the like. The program instructions recorded on the media may be those specially designed and constructed for the purposes of exemplary embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described exemplary embodiments, or vice versa.

A number of exemplary embodiments have been described above. Nevertheless, it should be understood that various modifications may be made to these exemplary embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Exemplary embodiments of the inventive concepts having thus been described, it will be obvious that the same may be varied in many ways. Such variations are not to be regarded as a departure from the intended spirit and scope of exemplary embodiments of the inventive concepts, and all such modifications as would be obvious to one skilled in the art are intended to be included within the scope of the following claims.

What is claimed is:

1. A backlight unit configured to emit light, the backlight unit comprising:
   a light guide plate;
   a first light source configured to provide light to the light guide plate;
   a second light source configured to provide light to the light guide plate; and
   the light guide plate comprising:
      on an upper surface of the light guide plate, a first pattern configured to emit light, from the first light source, and
      on a lower surface of the light guide plate, a second pattern configured to refract light from the second light source such that the light from the second light source is emitted from the upper surface of the light guide plate;
   wherein the first pattern comprises a plurality of first structures arranged in at least one line extending in an angled direction, and the angled direction is slanted at an angle with respect to a side surface of the light guide plate; and
   wherein a spacing between adjacent ones of the plurality of first structures, in the angled direction is smaller than any spacing between adjacent ones of the plurality of first structures in any direction other than the angled direction.

2. The backlight unit of claim 1, wherein the plurality of first structures protrude from the upper surface of the light guide plate.

3. The backlight unit of claim 1, wherein the plurality of first structures protrude from the upper surface of the light guide plate; wherein each of the plurality of first structures comprises an upper surface, through which light is emitted from the first structure, and a lower surface, through which light is incident on the first structure from the light guide plate; and wherein a cross-sectional area of the upper surface is greater than a cross-sectional area of the lower surface.

4. The backlight unit of claim 1, wherein each of the plurality of first structures has an inverse-trapezoid shape.

5. The backlight unit of claim 1, wherein the second pattern comprises a plurality of second structures arranged in at least one line parallel to a direction from which light incident from the first light source is guided in the light guide plate.

6. The backlight unit of claim 1, wherein the second pattern comprises a plurality of second structures recessed into the lower surface of the light guide plate.

7. The backlight unit of claim 1, wherein the second pattern comprises a plurality of second structures which protrude from the lower surface of the light guide plate.

8. The backlight unit of claim 1, wherein the second pattern comprises a plurality of second structures arranged on the lower surface of the light guide plate, wherein each of the plurality of second structures is one of a lenticular lens, a prism, and a polygonal protrusion.

9. The backlight unit of claim 1, wherein the first light source is configured to emit light onto a first side surface of the light guide plate and the second light source is configured to emit light onto a second side surface of the light guide plate, adjacent to the first side surface.

10. A display device comprising:
    a display panel configured to display a three-dimensional (3D) image in a 3D image display mode and to display a two-dimensional (2D) image in a 2D display mode;
    a first light source configured to provide light to a light guide plate in the 3D image display mode;
    a second light source configured to provide light to the light guide plate in the 2D image display mode; and
    the light guide plate comprising:
       on an upper surface of the light guide plate, a first pattern configured to emit light, from the first light source, toward the display panel, and
       on a lower surface of the light guide plate, a second pattern configured to refract light from the second light source such that the light from the second light source is emitted toward the display panel;
    wherein the first pattern comprises a plurality of first structures arranged in at least one line, wherein the at least one line is slanted at an angle with respect to a pixel included in the display panel.

11. The display device of claim 10, wherein the plurality of first structures protrude from the upper surface of the light guide plate.

12. The display device of claim 10, wherein the plurality of first structures protrude from the upper surface of the light guide plate, wherein each of the plurality of first structures comprises an upper surface, through which light is emitted from the first structure, and a lower surface, through which light is incident on the first structure from the light guide plate; and wherein a cross-sectional area of the upper surface is greater than a cross-sectional area of the lower surface.

13. The display device of claim 10, wherein each of the plurality of first structures has an inverse-trapezoid shape.

14. The display device of claim 10, wherein the second pattern comprises a plurality of second structures arranged in at least one line parallel to a direction from which light incident from the first light source is guided in the light guide plate.

15. The display device of claim 10, wherein the second pattern comprises a plurality of second structures recessed into the lower surface of the light guide plate.

16. The display device of claim 10, wherein the second pattern comprises a plurality of second structures which protrude from the lower surface of the light guide plate.

17. The display device of claim 10, wherein the first light source is configured to emit light onto a first side surface of the light guide plate and the second light source is configured to emit light onto a second side surface of the light guide plate, adjacent to the first side surface.

18. A backlight unit configured to provide light to a display panel, the backlight unit comprising:
   a light guide plate;
   a first light source configured to direct first light to a first side surface of the light guide plate; and
   a second light source configured to direct second light to a second side surface of the light guide plate, wherein the second side surface is adjacent to the first side surface; and
   wherein the light guide plate comprises:
      a first pattern on an upper surface of the light guide plate, the first pattern comprising a plurality of first structures configured such that first light incident on the first pattern is emitted from the light guide plate through the first pattern; and
      a second pattern on a lower surface of the light guide plate, the second pattern comprising a plurality of second structures configured such that second light incident on the second pattern is refracted and thereafter emitted from the light guide plate;
   wherein the first pattern and the second pattern are configured such that the first light is emitted from the light guide plate within a first range of angles and the second light is emitted from the light guide plate within a second range of angles, larger than the first range of angles.

19. The backlight unit of claim 18,
   wherein the plurality of first structures are arranged on the upper surface of the light guide plate in at least one line, and the plurality of second structures are arranged on the lower surface of the light guide plate in at least one line parallel to a first direction; and
   wherein the first light is incident on the light guide plate in the first direction.

20. The backlight unit of claim 18, wherein each of the plurality of first structures comprises a lower surface and an upper surface and a cross-sectional area of the lower surface is smaller than a cross-sectional area of the upper surface.

21. A backlight unit configured to emit light, the backlight unit comprising:
   a light guide plate;
   a first light source configured to provide light to the light guide plate;
   a second light source configured to provide light to the light guide plate; and
   the light guide plate comprising:
      on an upper surface of the light guide plate, a first pattern configured to emit light, from the first light source, and
      on a lower surface of the light guide plate, a second pattern configured to refract light from the second light source such that the light from the second light source is emitted from the upper surface of the light guide plate;
   wherein the first pattern and the second pattern are configured such that the light from the first light source is emitted from the light guide plate within a first range of angles and the light from the second light source is emitted from the light guide plate within a second range of angles, larger than the first range.

22. A display device comprising:
   a display panel configured to display a three-dimensional (3D) image in a 3D image display mode and to display a two-dimensional (2D) image in a 2D display mode;
   a first light source configured to provide light to a light guide plate in the 3D image display mode;
   a second light source configured to provide light to the light guide plate in the 2D image display mode; and
   the light guide plate comprising:
      on an upper surface of the light guide plate, a first pattern configured to emit light, from the first light source, toward the display panel, and
      on a lower surface of the light guide plate, a second pattern configured to refract light from the second light source such that the light from the second light source is emitted toward the upper surface of the display panel;
   wherein the first pattern and the second pattern are configured such that the light from the first light source is emitted from the light guide plate within a first range of angles and the light from the second light source is emitted from the light guide plate within a second range of angles, larger than the first range.

* * * * *